Aug. 5, 1958     C. M. WOLFE     2,846,656
ELECTRICAL PRESSURE DETECTING DEVICE

Filed May 12, 1953     3 Sheets-Sheet 1

INVENTOR.
CHARLES M. WOLFE
BY
J. Gordon Angus
ATTORNEY

Aug. 5, 1958     C. M. WOLFE     2,846,656
ELECTRICAL PRESSURE DETECTING DEVICE
Filed May 12, 1953     3 Sheets-Sheet 2

INVENTOR.
CHARLES M. WOLFE
BY
*D. Gordon Angus*
ATTORNEY

Aug. 5, 1958 C. M. WOLFE 2,846,656
ELECTRICAL PRESSURE DETECTING DEVICE
Filed May 12, 1953 3 Sheets-Sheet 3
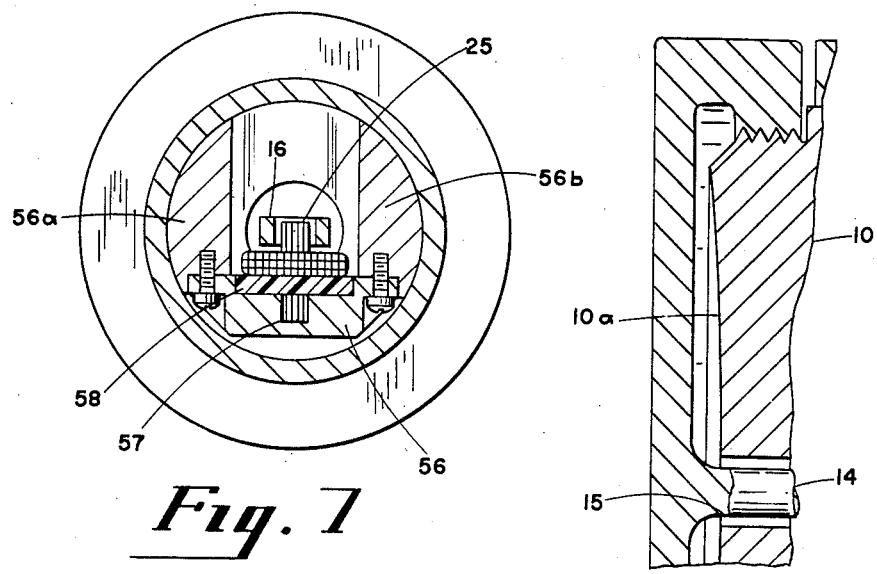
Fig. 7
Fig. 9
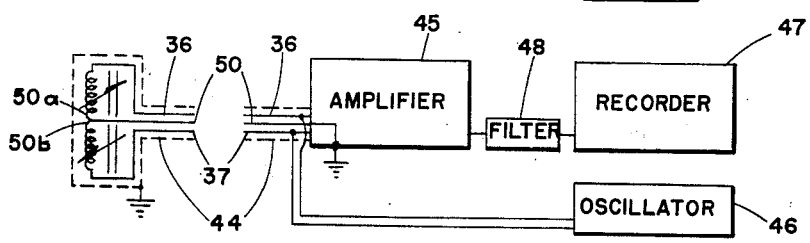
Fig. 8
INVENTOR.
CHARLES M. WOLFE
BY
D. Gordon Angus
ATTORNEY

2,846,656

ELECTRICAL PRESSURE DETECTING DEVICE

Charles M. Wolfe, Glendora, Calif., assignor to the United States of America as represented by the Secretary of the Navy Application May 12, 1953, Serial No. 356,262

(Filed under Rule 47(b) and 35 U. S. C. 118)

2 Claims. (Cl. 336—30)

This invention relates to electrical pressure detecting devices and has for its principal object to provide a pressure detecting or pickup device capable of large output response over a wide range of pressure variation, and which is compact, small of size, and free from error due to vibration and shock.

I carry out my invention by provision of a diaphragm to which is attached an armature in magnetic relation to a magnetic circuit. By this arrangement the armature moves with the diaphragm and varies the reluctance of the magnetic circuit.

A feature of the construction is the restraining of the diaphragm and its armature member from vibration in all but one direction so that it has only one natural mode of oscillation. This renders the device exceptionally free from error due to vibration and shock.

A further feature resides in the construction whereby the assembly of the diaphragm, armature and coil are separate from the outside shell or housing.

Thus, the diaphragm is not distorted by the tightness with which the parts of the pickup are assembled, nor is it distorted by stress or strain of an engine chamber wall to which it is attached.

The electrical circuit connected to the pickup is preferably a two-coil balanced reluctance type having substantially liner response over a wide range of pressures and frequencies and capable of large output.

The foregoing and other features of the invention will be better understood from the following detailed description and the accompanying drawing, of which:

Fig. 7 is a cross-section view taken at line 7—7 of Fig. 3; and

Fig. 8 shows an electrical circuit for measuring the output from the pickup.

Fig. 9 is an enlarged broken away view showing the manner in which the diaphragm is backed up by contoured stop to prevent over-straining.

Figure 2:
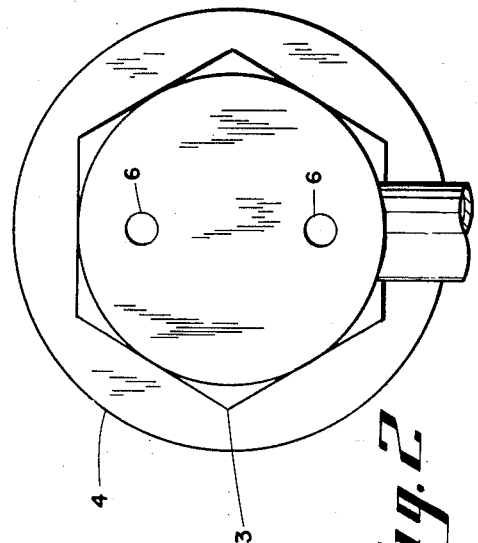
Fig. 2 is an end view of the pickup device.

Referring to the drawing, the pickup comprises a housing 1 of cylindrical form, threaded at its forward end 2 for attachment to the wall of a chamber or device whose pressure is to be measured; for example, the combustion chamber of a jet propulsion motor, aero-resonator or the like. For the purpose of tightening the housing to the chamber there is formed around the outside of the housing a nut arrangement 3 adapted to receive a wrench to tighten a flange or shoulder 4 against the wall of the chamber. The rear end of the cylindrical pickup is closed by cap 5 threaded into the end of the pickup; and to assist in the threading, a pair of bores 6 are formed partway through the cap to receive the elements of a turning wrench. A resilient ring or washer 7 serves as seal between a flange on the cap and the end of the pickup.

The forward end 2 of the cylindrical pickup housing is closed by diaphragm 8 which is in the form of a cap having a rim 9 threaded to an inner supporting member 10. The end 10a of member 10 is preferably dished or contoured as shown, to conform with and act as a stop for the diaphragm to limit its motion. To prevent appreciable leakage of gas under pressure into the device, the member 10 is provided with an O-ring 11 located in a peripheral groove 12.

The diaphragm has formed on it a threaded stud 14 protruding from a shoulder 15 mounted concentrically on the diaphragm and extending within the inner supporting member. An elongated yoke member 16 has its forward end threaded to the stud 14 and has threaded within its rear end a screw 17 which holds a flexure strap 18 against the end of the yoke. This flexure sttrap may be made of a suitable resilient material such as a thin resilient Phosphor bronze of about 10 mils thickness, which fits within a rectangular opening 19 within a bushing portion 20 integral with member 10 which is held in position by mounting screws 21 passing through holes 22 of a webbed portion or partition 23 forming within the housing two compartments separated by the partition. The flexure member 18 is securely held at its shorter peripheral edges by means of screws 24 threaded into member 10. In front of the flexure member 18, the bushing portion 20 is provided with a pair of lips 61 and 62 at either side thereof which have surfaces 52 and 53 which recede away from member 18 toward the center so as to provide room for member 18 to flex toward these surfaces 52 and 53. A central opening 54 is left between the two portions 50 and 51, and through this central opening extends the neck 55 of member 16. By this construction, the member 18 is securely held at its two ends to the portion 20 in such manner that member 18 is free to be flexed in front and back direction, but in no other direction, and in flexing, the member 16 is correspondingly moved back and forth.

There is fixed within the housing a supporting member 56 fastened to side members 56a and 56b by suitable screws, and these members should be of non-magnetic material such as brass. There is fitted within member 56 a rigid insulating washer member 58. Member 56 is provided with a longitudinal slot 57 into which is fitted the edge of an electromagnet core 25. This core may be made in a conventional manner of iron laminations or the like and is E-shaped, that is, it has respective side arms 28 and 29 and a central arm 30, which does not extend as far as the side arms. Pin members 60 passing through member 56 and the core serve to hold the core in place in member 56.

Two magnet coils 26 and 27 are mounted on the respective side arms 28 and 29 of the core; and these rest on rigid insulating washer members 58 fitted within member 56. There is fastened to the yoke piece an armature member 31 of magnetic material, which acts as a core means, such as iron laminations, positioned to have an air gap between its ends and the pole pieces 28 and 29 and also providing an air gap between the side of the armature and the end of the core member 30.

Leads 50a and 50b from the ends of the respective coils 26 and 27 are brought to a terminal 32 mounted on a panel 33 of insulation suitably fastened to web 23 of the housing by screws or the like 34 and 35. The leads 36 and 37 from the opposite ends of the two coils will be connected to the respective terminals 38 and 39 mounted on the same insulating panel.

To facilitate bringing out leads from the terminals 32, 38 and 39 a nipple 43 may be welded into an opening in the side of the housing near or opposite these terminals. Thus, the leads 50, 36 and 37 of Fig. 8 can be in effect continued from these terminals by attachment of corresponding leads, passing out through the nipple, to the respective terminals; and if desired, the conduit for these three leads can be shielded by grounded shielding 44.

Figure 3:
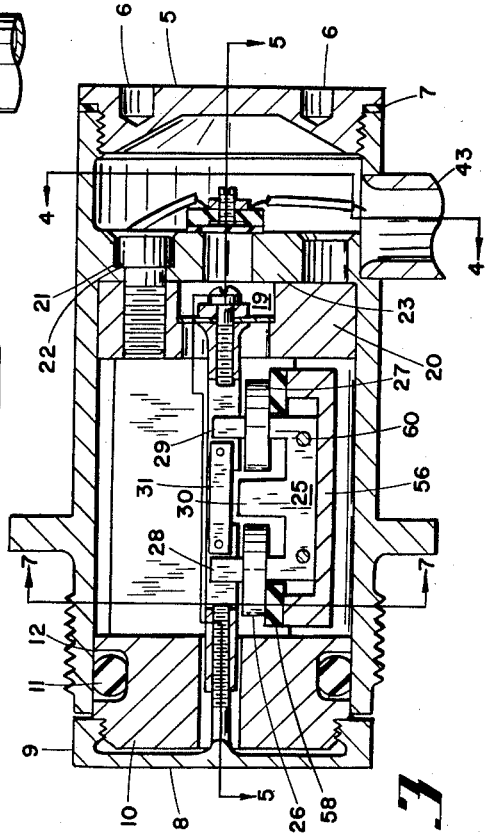
Fig. 3 is a cross-section view taken at line 3—3 of Fig. 2.
Figure 1:
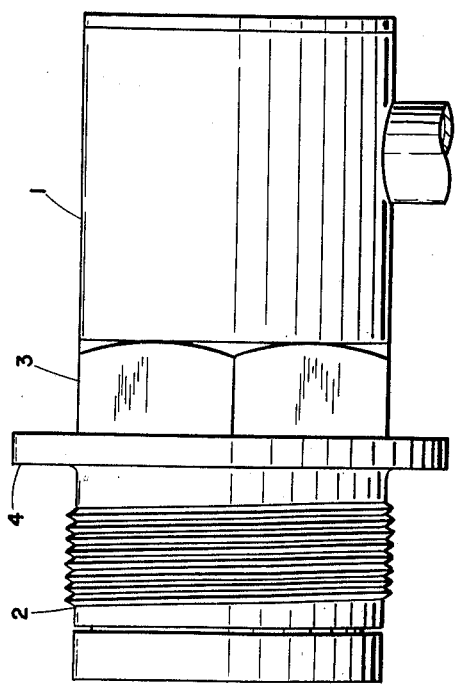
Fig. 1 is a side view of a pickup device according to the present invention.
Figure 4:
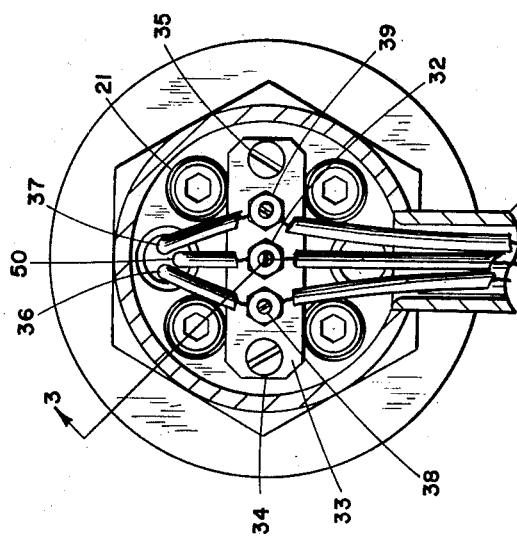
Fig. 4 is a cross-section view taken at line 4—4 of Fig. 3.
Figure 6:
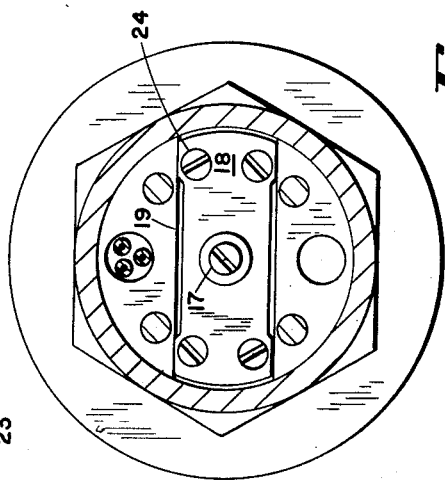
Fig. 6 is a cross-section view taken at line 6—6 of Fig. 5.
Figure 5:
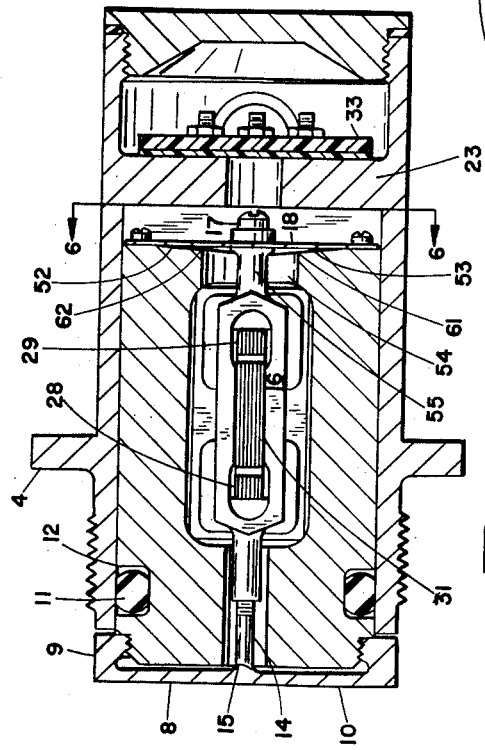
Fig. 5 is a cross-section view taken at line 5—5 of Fig. 3.

In operation, the threads at 2 will be threaded into the opening in the wall of the chamber whose pressure is to be measured, and if desired, a washer (not shown) may be placed against the shoulder 4 to prevent leakage. The changes of pressure within the chamber will be manifested by corresponding movement of diaphragm 8; with relatively high pressure, the pressures against the diaphragm will move the diaphragm and its assembly with the yoke and armature, to the right (with reference to Fig. 3) against the flexure of the member 18; and with relatively less pressure there will be relatively less movement to the right. When the diaphragm moves to the right, the yoke 16 correspondingly moves to the right, thus decreasing the air gap between the right hand end of armature 31 and the pole piece 29 and increasing the air gap between the left hand end of armature 31 and the pole piece 28. Since the magnetic circuit for each coil passes through the central pole piece 30, it follows that an increase of the air gap between the respective pole pieces 28 and 29 and the armature member decreases the reluctance of the magnetic circuit and correspondingly decreases the impedance of the corresponding coil, and vice versa; and when the impedance of one coil is increasing, the impedance of the other coil is correspondingly decreasing.

The electrical system of Fig. 8 is adapted to making measurements in response to the change of impedance of the coils. The ungrounded leads 36 and 37 are carried to the ungrounded input terminals of a balanced amplifier 45; and to these same ungrounded terminals there is applied the output of an oscillator 46. The amplifier may be of the type having both a balanced input and output with the two parts of the output on opposite sides of ground opposed to each other so that when the voltage applied across the two input portions on opposite sides of ground are equal, there will be no output from the amplifier. A suitable amplifier for the purpose is described in "Analytical Instruments," published by Consolidated Engineering Corporation, 1948–1949. The oscillator may be any suitable type preferably having a frequency in the order of about 1,000 to 10,000 cycles per second. A suitable oscillator is described in "Analytical Instruments" published by Consolidated Engineering Corporation, 1948–1949.

In the absence of pressure on the diaphragm, the impedances of the two coils 26 and 27, connected across the input of the balanced amplifier, are equal, so that there is no unbalance of impedance across the amplifier and hence no output from the amplifier; but when the impedance of one coil changes relative to that of the other, due to pressure on the diaphragm, there is a corresponding unbalance of the impedances across the two sides of the amplifier input, with a resulting output, and the amplitude of the output of the amplifier will be a measure of the pressure on the diaphragm. A filter 48 connected to the output of the amplifier serves to filter out extraneous signals which might adversely affect the reading of a recorder 47 connected at the output of the filter. This recorder can be of a type which is well known, such as that described in "Analytical Instruments" published by Consolidated Engineering Corporation, 1948–1949. It will serve to make a record of the amplitude of the pressure variation at the diaphragm.

Although the lines connected to the filter and recorder are shown in single line form, it will be understood that the line will actually have two conductors or a return path.

My novel construction has many advantages. By reason of the support of the armature on the yoke which is mounted on the flexure strip 18, the armature is restricted to movement in one direction only, that is the longitudinal direction of motion along the longitudinal axis of the pickup; and is rigidly restrained in all other directions. Thus, the device is exceptionally free from error due to vibration and shock. A further important advantage resides in the fact that the assembly of the diaphragm, armature and coil is separate from the outside shell; and the seal is made through the O-ring. For this reason, this inside assembly may be made the same for all pickups of a given pressure range; while the outside housing or shell 1 can be designed to comply with test requirements, so that the shell might be made different for different applications. The shells could be made to have the threaded section for mounting, such as is shown, or on the other hand, could use some other mounting arrangement such as a bolted flange.

The separation of the diaphragm assembly from the shell is a very significant and important feature of the construction. By reason of this arrangement, the diaphragm is not distorted by the tightness with which the pickup is attached or screwed to the chamber whose pressure is being measured; nor is it distorted by heat or stress or strain of the chamber or engine wall.

A further advantage resides in the fact that the flush mounting of the diaphragm at the chamber wall substantially eliminates cavity echo which is a common fault of conventional pressure pickups which are not constructed in the manner of the present invention, and which often leads to large errors in dynamic response.

Other significant advantages are that the device can be made small in size as compared with other devices of this character. Furthermore, it can easily be made watertight by reason of the seal arrangement.

I claim:

1. A balanced, variable-reluctance type transducer comprising: an open-ended housing having an inner and an outer surface, a transverse partition located within the housing forming a first compartment and a second compartment, attaching means on the outer surface of the housing; an inner supporting member within the first compartment of said housing attached rigidly at one end to the partition; a diaphragm having a flectural portion and having its perimeter fastened to the opposite end of said supporting member and covering the open end of the first compartment of said housing; sealing means adjacent to said diaphragm between the supporting member and the housing inner wall, said sealing means pressure sealing the inner supporting member to the inner wall of the housing and serving as a resilient spacing means for the inner supporting member in said housing thereby making the inner supporting member and the diaphragm unaffected by any distortion of the outer housing; electrical coil means and a first core means rigidly secured within the inner supporting member; yoke means rigidly attached to the flectural portion of the diaphragm at one end and attached to a flexure element secured to the inner supporting member at the opposite end whereby said armature is adapted to move along the longitudinal axis of the inner supporting member and movement of said armature is restricted in all directions except the said axial direction; a second core means secured to the yoke and coacting with the first core means, said first and second core means having balanced air gaps between them whereby changes of pressure against the diaphragm correspondingly move the armature in an axial direction, differentially varying the air gaps and thereby unbalancing the reluctance of the magnetic circuit including said core means and creating a signal proportional to the variation in pressure; electrical connecting means for the said coil means located in the second compartment and means for connecting an external cable to the said electrical connecting means in the second compartment.

2. An electrical pressure-responsive pickup unit comprising an elongated housing, a transverse partition within the housing dividing the interior thereof into a first compartment and a second compartment, a supporting member within said first compartment having its outer end rigidly attached to said partition, a diaphragm having a flectural portion and having a periphery secured to the inner end of said supporting member and closing the inner end of said first compartment, resilient spacing means between said supporting member and the inner wall of the housing, electrical coil means and a first core means rigidly secured within said supporting member, a flexure element secured to the outer end of the supporting member, yoke means having its inner end rigidly attached to the flectural portion of the diaphragm and its outer end attached to the flexure element whereby said armature is adapted to move along the longitudinal axis of said supporting member and movement of said armature is restricted in all directions except the said axial direction, a second core means secured to the yoke and coacting with the first core means, said first and second core means having balanced air gaps between them whereby changes of pressure against the inner surface of the diaphragm correspondingly move the armature in an axial direction, differentially varying the air gaps and thereby varying the reluctance of the magnetic circuit including said core means and creating a signal proportional to the variation in pressure, electrical connecting means for said coil means located in the second compartment, and means for connecting an external cable to said electrical connecting means.

References Cited in the file of this patent

UNITED STATES PATENTS

| | | |
|---|---|---|
| 2,408,524 | Mestas | Oct. 1, 1946 |
| 2,510,073 | Clark | June 6, 1950 |
| 2,563,899 | Wiancko | Aug. 14, 1951 |
| 2,623,940 | Templeman | Dec. 30, 1952 |
| 2,641,742 | Wolfe et al. | June 9, 1953 |
| 2,661,460 | Matthews | Dec. 1, 1953 |